United States Patent [19]
Lamons et al.

[11] Patent Number: 5,666,397
[45] Date of Patent: Sep. 9, 1997

[54] INDIVIDUAL TELEPHONE LINE CALL EVENT BUFFERING SYSTEM

[75] Inventors: Scott Putnam Lamons; Jeffrey Don Emmel; Frank Parrish, all of Fort Collins, Colo.

[73] Assignee: Clearwave Communications, Inc., Fort Collins, Colo.

[21] Appl. No.: 399,626

[22] Filed: Mar. 7, 1995

[51] Int. Cl.⁶ .......................... H04M 3/22; H04M 15/00
[52] U.S. Cl. .................. 379/34; 379/130; 379/133
[58] Field of Search ........................ 379/1, 34, 93, 379/96, 98, 112, 113, 130, 127, 133, 140, 142, 376

[56] References Cited

U.S. PATENT DOCUMENTS

| | | | |
|---|---|---|---|
| 5,054,055 | 10/1991 | Hanle | 379/376 |
| 5,067,150 | 11/1991 | Santomi | 379/142 |
| 5,146,490 | 9/1992 | Beckman | 379/113 |
| 5,343,516 | 8/1994 | Callele | 379/98 |
| 5,349,638 | 9/1994 | Pitroda | 379/142 |
| 5,351,289 | 9/1994 | Logsdon | 379/142 |
| 5,535,265 | 7/1996 | Suwandhaputra | 379/98 |

*Primary Examiner*—Curtis Kuntz
*Assistant Examiner*—Vijay Shankar
*Attorney, Agent, or Firm*—Duft, Graziano & Forest, P.C.

[57] ABSTRACT

An individual telephone line call event buffering system is disclosed which provides backup memory storage for incoming and outgoing call events, including calling line identification (CLID) information in a computer based telephone line monitoring system when the computer or its call processing application software is off-line. The call event buffering system includes a hardware based call processor, distribution controller and memory system, and a software based computer monitoring system, all of which operate in conjunction with a standard personal computer, a standard telephone line, standard telephone line equipment including, but not limited to, a telephone, facsimile, and modem, and standard telephone central office services including, but not limited to, Caller-ID, distinctive ring, call transfer, forwarding and conferencing, voice mail, and visual message waiting.

15 Claims, 2 Drawing Sheets

INDIVIDUAL TELEPHONE LINE CALL EVENT BUFFERING SYSTEM

FIELD OF THE INVENTION

This invention relates to telecommunications management systems, and more particularly to a telephone line monitoring and call event buffering system for incoming and outgoing call events on a standard single telephone line from a central office based service.

PROBLEM

Incoming Calling Line Identification (ICLID) or Caller-ID is an analog FSK signal applied by a telephone company over standard analog telephone lines. The signal is transmitted to the subscriber on local loop lines between a first and second ring pattern and contains a series of binary frequencies that translate into an ASCII data string bearing information about the call. The information about the call includes, but is not limited to, date, time, calling name identification, and calling number identification. U.S. Pat. No. 4,551,581, issued to Doughty on Nov. 5, 1985 discloses the method and apparatus for transmitting an ICLID data stream.

Numerous hardware devices are available that can be connected to a subscriber line to decode, display, and transmit outdialing and ICLID information. Other products exist that include computer based systems with application software to process outdial and ICLID data. For example, U.S. Pat. No. 5,054,055, issued to Hanle and Curry of Bell Atlantic Network Services, Inc. on Oct. 1, 1991, discloses a method and system for interfacing ICLID information with a computer to provide ICLID based subscriber applications.

While the benefits of computer based outdialing and ICLID processing applications are well known to telephone subscribers, such applications are heretofore only provided in a seamless fashion when the computer and its processing software are operating, and the subscriber telephone line is uninterruptedly connected to the computer. Because computer users are increasingly mobile due to the advent of portable computers, and users rarely leave computers running 24 hours a day 7 days a week, the above described systems fail to provide uninterrupted around the clock call event recording.

SOLUTION

The above described problems and deficiencies are solved and a technical advance in the field of telecommunications management systems is achieved by the call event buffering system of the present invention. The call event buffering system automatically provides a large capacity uninterrupted memory store on a subscriber telephone line monitoring device, independent of the computer being operational or connected to the monitoring device. The call event buffering system also provides an automatic restartable memory download from the monitoring device to a computer as any time the computer is both operating and communicatively connected to the monitoring device.

The overall telephone management system which contains the call event buffering system, cooperatively integrates hardware and software. The hardware includes, but is not limited to, a computer, and an independently microprocessor controlled telephone management device having a single central office analog telephone line input, multiple telephone line outputs to a variety of telephony based equipment, ICLID decode circuitry, transmit and data storage circuitry, and an interface for communicating with the computer. The telephone management device functions independently to provide telephone line monitoring, control, processing, and connectivity between a single telephone line, various telephony based equipment, and the computer. More specifically, the telephone management device functions in the context of the present invention, to provide telephony information, including ICLID data, call event recording, decode circuitry, memory, battery back-up for the microprocessor and memory, and a serial data transmission interface to the computer. The battery backed-up memory circuitry can be enabled to record incoming and outgoing telephone line activity and ICLID information when the primary memory destination resident in the computer is unavailable.

Other features of the overall telecommunications management system includes a tone generator and detector, line and phone switch hook detector circuitry, line ringing detector, line hold circuitry, line audio monitor circuitry with speaker, real time clock circuitry, and line state indicator circuitry. The overall system additionally includes tools such as call announce notification, answering and dialing control by user input command, incoming and outgoing call chronology reporting, message reporting, automatic database entry, database storage, custom database reporting, linkage to installed call management and personal information management software applications, and call screening.

The call event buffering system stores incoming and outgoing telephony information, including ICLID, for later retrieval and processing by computer based call processing systems. The system automatically detects computer and application software status, and provides immediate response and control to enable back up memory for telephony information. In addition, the system provides sufficient memory capacity for the large number of call event entries typically associated with extended periods of computer system unavailability. The system automatically detects when the computer system is re-connected and provides for the automatic transfer of stored telephony data from the monitoring device memory to the computer.

DETAILED DESCRIPTION

Figure 1:
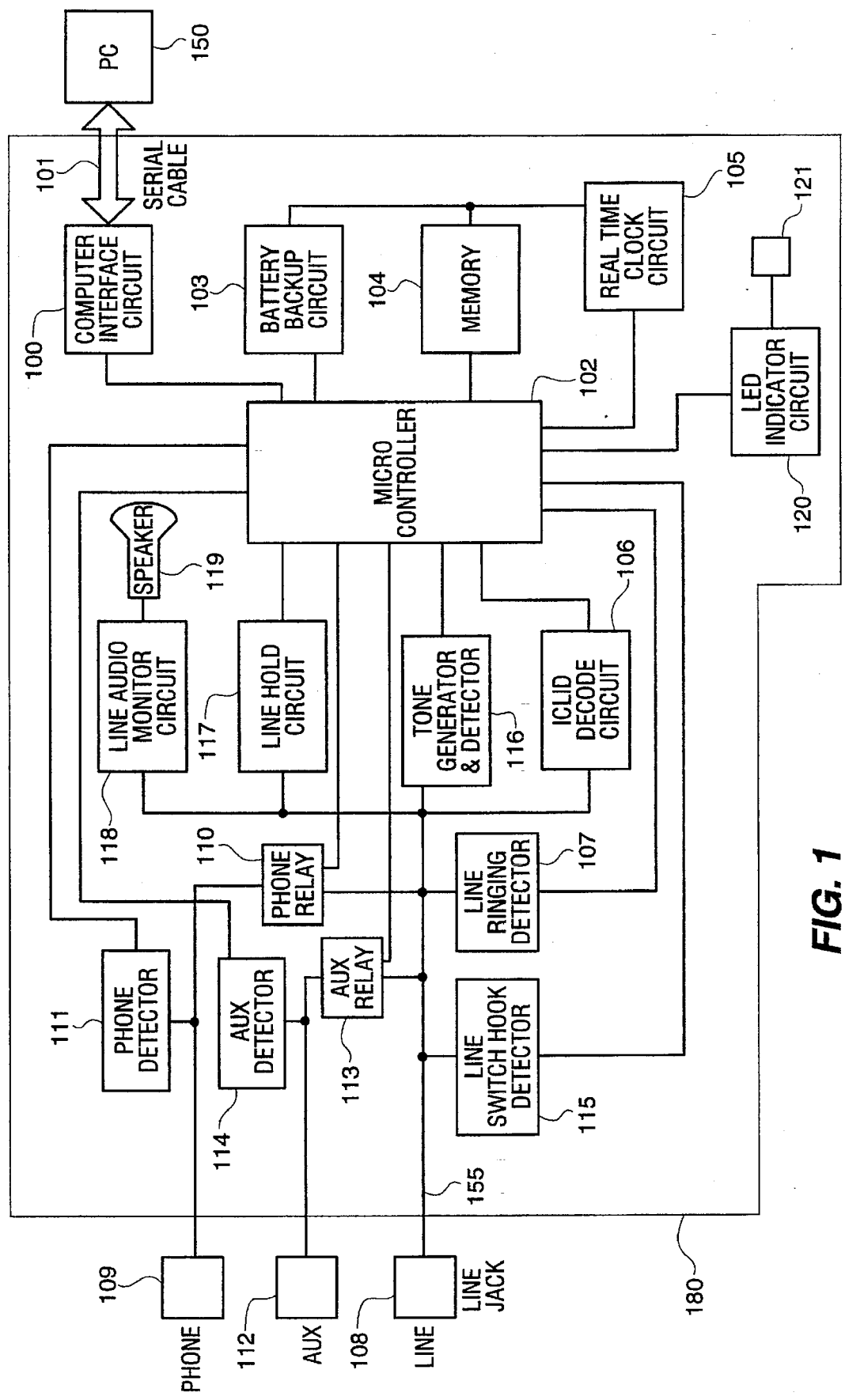
FIG. 1 illustrates, in block diagram form, the functional level architecture of the hardware unit constructed according to the preferred embodiment.

System Architecture FIG. 1

FIG.1 illustrates the elements and functions of the call event buffering system in the telephone communications management system. The existing telephone communications management system includes a telephone management device 180 that is the interface for the telephone line 155, telephone line equipment including, but not limited to, 112 and 109, and to at least one personal computer (PC) 150. The PC 150 is operatively connected to the telephone management device 180 illustrated in FIG. 1 through PC interface circuit 100 via a standard 9 or 25 pin serial cable 101. Alternatively, this connection could be as easily established by a wireless connection supported by the appropriate circuitry and data link protocol as a matter of design choice in a manner considered within the scope of this invention.

The PC interface circuit 100 is connected to micro-controller 102. The PC interface circuit 100 monitors the Data Terminal Ready (DTR) lead of the serial cable 101 which is continuously representing the computer system operating status. DTR active indicates that PC 150 is connected and operational. DTR inactive indicates that PC 150 is off, interrupted, or disconnected. Similarly, the status of call processing application software is monitored by the PC interface circuit through serial cable 101. A buffer enable/disable command from software of the present invention running on PC 150 notifies micro-controller 102 of the status of call processing application software. A buffer disable command indicates that call processing software is operational. A buffer enable command indicates that call processing software is interrupted, not running, or otherwise unavailable. Status is established automatically and independently of the user achieving automatic and immediate response of the call event buffering system for continuous uninterrupted telephone line call event recording.

PC interface circuit 100 forwards status bits to micro-controller 102, setting it to either an online or offline mode. In the online mode, telephone line call events are decoded, formatted, and transmitted in real time to PC 150 for call processing. In the offline mode, incoming and outgoing telephone line activity information is stored in battery backed up memory using battery back up circuitry 103 and memory 104. The memory is a standard commercially available Static Random Access read/write memory (SRAM) integrated circuit or functional equivalent. In the preferred embodiment, 64 Kbits of SRAM is capable of storing up to or about 100 call events. The amount of memory can be readily increased to provide for increased call event storage capacity as a matter of design choice. The Real Time Clock (RTC) circuitry 105 provides a time stamp for outgoing call events. Incoming call event time stamp is established from ICLID information or from the RTC. The RTC 105 is itself backed up and is set and maintained accurate from the time stamp of ICLID incoming calls or the computer clock.

On the telephone line side of micro-controller 102, the analog telephone line 155, with or without ICLID signal, is connected to Caller-ID decode circuit 106, and line ringing detector circuit 107, through a standard RJ11 phone jack 108. The Caller-ID decode circuit 106 is a commercially available integrated circuit compatible with FSK decoding capability. A single premises-resident touch-tone (DTMF) telephone 109 is connected through phone relay 110 to the telephone 109. The presence of telephone 109 is sensed by phone detector circuitry 111, which sets the state of micro-controller 102 to recognize the presence of the telephone 109. Similarly, the presence of auxiliary telephone line equipment 112, such as a modem, fax machine, fax/modem, or another telephone device or answering machine, connected through Aux relay 113 to the phone line 155, is sensed by Aux Detector circuitry 114 which sets the state of the micro-controller 102 to recognize the presence of auxiliary equipment 112.

For the monitoring and call event capturing of outbound calls, a line switch hook detector 115 senses a receiver off-hook condition for telephone 108, and notifies the micro-controller 102. Tone generator/detector circuit 116, detects, decodes, and transmits the outbound calling number identification to the micro-controller 102 which adds a time stamp from the RTC 105 to the call event. When an on-hook condition occurs for telephone 108, a second time stamp is associated with the on-hook call event, and micro-controller 102 logs the outbound calling number identification to either PC 150 or memory 104 depending upon the online/offline mode status discussed previously. For outbound dialing from the PC 150 call processing application software, micro-controller 102 receives instructions from PC 150 enabling it to send commands to tone generator/detector circuit 116 to subsequently transmit the outgoing call tone sequence through line 155 to line jack 108 and beyond by seizing line 155 via line hold circuit 117.

For incoming call events, monitoring and call event capturing is accomplished with the line ringing detector 107 and FSK decode circuit 106 and line switch-hook detector circuit 115. The online/offline mode state of micro-controller 102 determines whether incoming call events and their associated information are passed through to PC 150 prior to the second ring, or are stored in the memory 104. To complete the telephone line monitoring features, line hold circuit 117, line audio monitor circuit 118, speaker 119, line state indicator circuit 120, and light emitting diode (LED) 121, are operationally interconnected. These components provide line monitoring and control features to the system, but do not contribute to the buffer feature that is the subject of the present invention.

During a period when PC 150 is interrupted or otherwise not available, the memory 104 of the call event buffering system accumulates and stores call event information. When the PC 150 is re-established, micro-controller 102 receives an updated device status command. The firmware of micro-controller 102 is established such that this update to the device status command initiates a transfer of the stored contents of the memory to the call processing application software of PC 150. This is done automatically and transparently to the PC user. With adequate memory capacity, all call events and their associated entry information are downloaded to the call processing software.

Battery back up in the event of a power failure achieves continuous operation of call event logging. Battery back up for the low power consumption external hardware of the present invention is capable of long periods of operation at a significantly reduced power budget than would be required to back up a personal computer. The batteries and battery back up circuit 103 can be chosen to be of a rechargeable type so that restored power automatically recharges the back up supply as a matter of design choice within the scope of this invention.

Figure 2:
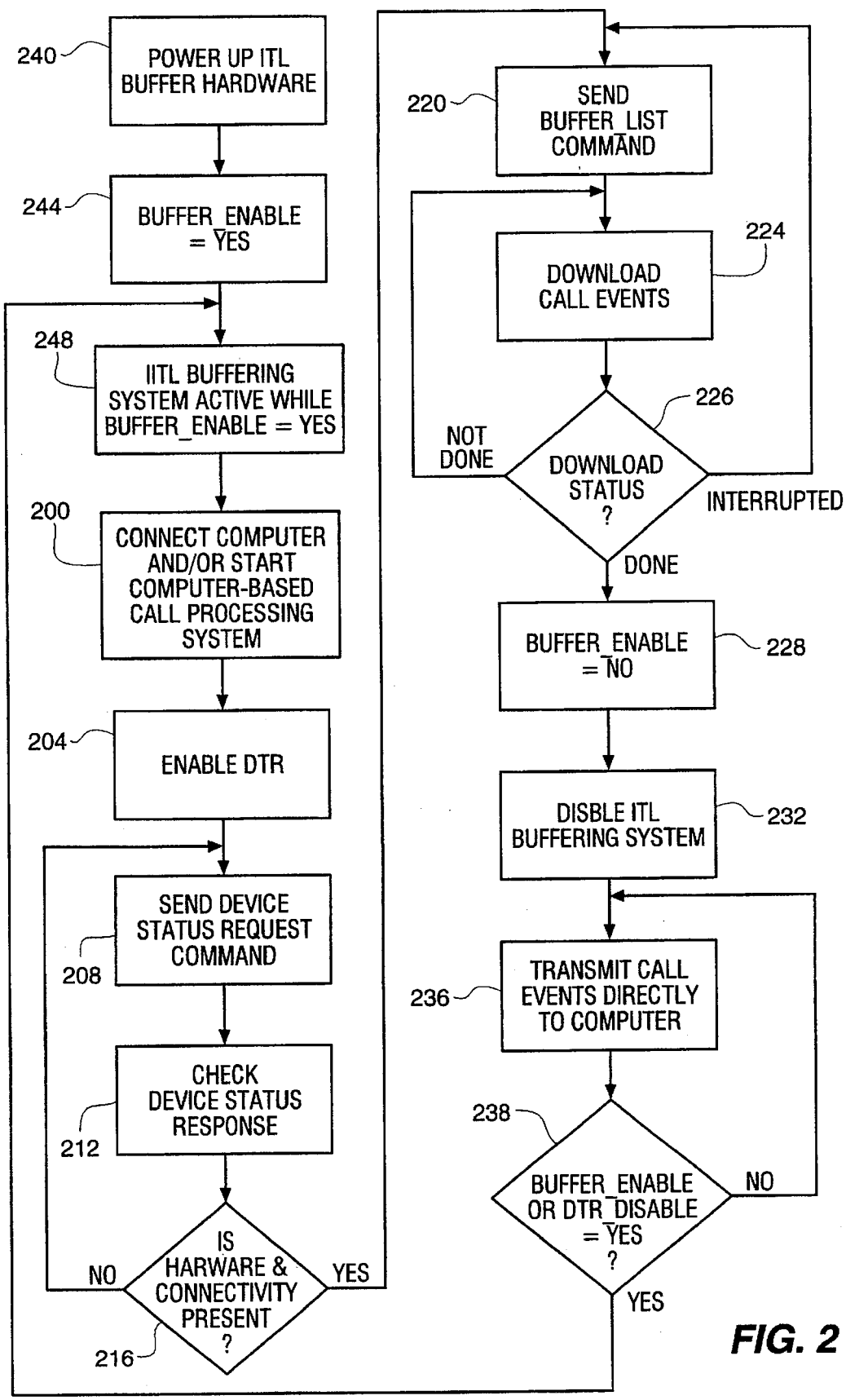
FIG. 2 is an operational flow diagram of the call event buffering system of the preferred embodiment of the invention.

Operational Architecture FIG. 2

FIG. 2 illustrates the operational flow and function of the call event buffering system. As a preliminary matter and for purposes of the present discussion, the call event buffering hardware is powered up at step 240 and a buffer-enabled indicator, or its equivalent, set to yes at step 244. The call event buffering system continuously and uninterruptedly stores call events at step 248 while the buffer enable indicator is set to yes. Call activity includes, but is not limited to, any incoming or outgoing telephony event occurring over a telephone interface to the central office. The telephone interface can be wire or wireless based.

Key to the overall call event buffering system is that the call event buffering hardware is operational whether or not the PC hardware 150 is operational or even connected to serial cable 101 as illustrated in FIG. 1. Therefore, as the user desires, PC 150 may be powered on or powered off, and/or connected or disconnected as part of the normal system use.

At a time when the user wishes to review telephone event records stored by the call event buffering system, the user's PC 150 must be connected to the call event buffering hardware at serial cable 101, and the PC based call event system software must be activated at step 200 in FIG. 2. Once connected and active, the Data Terminal Ready VRS232 protocol signal must be enabled over serial cable 101 at step 204. A device status request command is sent at step 208 from the PC 150 to determine the presence of and connectivity to the call event buffering hardware previously discussed in FIG. 1. The PC 150 then checks for an appropriate response from the device status request at step 212, to establish and verify the presence of the necessary hardware and connectivity through serial cable 101. If the necessary hardware and connectivity is not present, the call event system continues to actively store call events at step 248. If the necessary hardware and connectivity is present, a buffer list command is sent from PC 150 to the call event buffering hardware at step 220 to determine the contents of the memory 104.

A record of each call event is downloaded from the memory 104 to the PC 150, at step 224, until the download is complete at decision step 226. Specifically, micro-controller 102 executes a set of firmware instructions to access all call events from memory 104 and to transmit the call events and associated information to the PC 150. If the download is unsuccessful or otherwise interrupted, (download status=INTERRUPTED), processing continues following the interruption at the buffer-list operation step 220. Downloads may be interrupted by a new call event which occurs during the download operation. In this case, the downloading operation at step 224 is aborted and the new call event is appended to the end of the call event buffer. This approach avoids any loss of call event data during the downloading operation.

If the download is successful, a buffer disable command (buffer enable=no) is sent to micro-controller 102 at step 228. If the download is not successful, the download is restarted at step 220. The disable command indicates to micro-controller 102 that PC 150 is available for receiving subsequent call events without having them stored and forwarded. The call event system is disabled at step 232, and processing continues at step 236 by transmitting all call events directly to PC 150 while the call event buffering system is disabled. At a time when the system is enabled once again at decision step 238, PC 150 is operationally disabled, or the data terminal ready indicator is turned off, meaning that connectivity with PC 150 has been lost, processing returns to step 248 where the call event system actively stores incoming call events. The call event hardware of FIG. 1 continues to store incoming call events until such time as the user connects and restarts the call event software at step 200 and the call event buffering system is once again disabled at step 228.

Summary

The individual telephone line call event buffering system of the present invention provides uninterrupted storage and delivery of call events including, but not limited to, individual calling line identification associated with incoming calls, as well as out dialing information, as part of an overall computer based telephone line monitoring system. While specific embodiments of this invention are disclosed herein, it is expected that those skilled in the art can and will design alternate embodiments of this invention that fall within the scope of the following claims.

We claim:

1. An event buffering system in a telephone communications management system that includes a telephone management device having a processor communications interface accessible to a detachable processor, and an interconnect between at least one telephony based device and a telephone line, said event buffering system comprising:

means for automatically supplying an uninterrupted record of each incoming and outgoing telephony event occurring over said telephone line, from said telephone management device to said detachable processor by way of said processor communications interface, independent of said detachable processor being intermittently in at least one state selected from a group consisting: non-operational, and communicatively disconnected from said telephone management device.

2. An event buffering system according to claim 1, wherein said means for supplying includes:

means for monitoring each said incoming and outgoing telephony event occurring over said telephone line; and means for storing into a memory in said telephone management device, each said record of each said incoming and outgoing telephony event occurring over said telephone line while said detachable processor is in at least one state selected from a group consisting of: non-operational, and communicatively disconnected from said telephone management device.

3. An event buffering system according to claim 2, including:

means for detecting when said detachable processor is in at least one state selected from said group consisting of: non-operational, and communicatively disconnected from said telephone management device.

4. An event buffering system according to claim 2 including:

means, responsive to said detachable processor being operational and communicatively connected to said telephone management device, for transferring each said record of each said incoming and outgoing telephony event from said memory to said detachable processor by way of said processor communications interface; and means, responsive to a complete transfer of each said record of each said incoming and outgoing telephony event, for disabling that portion of said event buffering system that stores each said record of each said incoming and outgoing telephony event, to allow each subsequent record of each said incoming and outgoing telephony event to pass directly through said processor communications interface to said detachable processor.

5. An event buffering system according to claim 4, wherein said transferring means includes:

means, responsive to an interrupted transfer of each said record of each said incoming and outgoing telephony event, for restarting said transferring means after recording each intervening incoming and outgoing telephony event occurring between said interrupted transfer and a restarted transfer.

6. An event buffering system according to claim 4, including:

means for detecting when said detachable processor is operational and communicatively connected to said telephone management device.

7. An event buffering system according to claim 1, wherein said means for supplying includes:

means for supplying uninterrupted power to said telephone management device by an independent power source.

8. An event buffering method in a telephone communications management system that includes a telephone management a device having a processor communications interface accessible to a detachable processor, and an interconnect between at least one telephony based device and a telephone line, said method comprising:

automatically supplying an uninterrupted record of each incoming and outgoing telephony event occurring over said telephone line, from said telephone management device to said detachable processor by way of said processor communications interface, independent of said detachable processor being intermittently in at least one state selected from a group consisting of: non-operational and communicatively disconnected from said telephone management device.

9. A method according to claim 8, wherein said supplying step includes:

monitoring each said incoming and outgoing telephony event occurring over said telephone line; and storing into a memory in said telephone management device, each said record of each said incoming and outgoing telephony event occurring over said telephone line while said detachable processor is in at least one state selected from a group consisting of: non-operational, and communicatively disconnected from said telephone management device.

10. A method according to claim 9, including:

detecting when said detachable processor is in at least one state selected from said group consisting of: non-operational, and communicatively disconnected from said telephone management device.

11. A method according to claim 9 including:

transferring each said record of each said incoming and outgoing telephony event, from said memory to said detachable processor by way of said processor communications interface, in response to said detachable processor being operational and communicatively connected to said telephone management device; and disabling that portion of said event buffering system that stores each said record of each said incoming and outgoing telephony event, to allow each subsequent record of each said incoming and outgoing telephony event to pass directly through said processor communications interface to said detachable processor, in response to a complete transfer of each said record of each said incoming and outgoing telephony event.

12. A method according to claim 11, wherein said transferring step includes:

restarting said transferring step after recording each intervening incoming and outgoing telephony event occurring between said interrupted transfer and a restarted transfer, in response to an interrupted transfer of each said record of each said incoming and outgoing telephony event.

13. A method according to claim 11, including:

detecting when said detachable processor is operational and communicatively connected to said telephone management device.

14. A method according to claim 8, wherein said supplying step includes:

supplying uninterrupted power to said telephone management device by an independent power source.

15. An event buffering system in a telephone communications management system including a telephone management device having a processor communications interface accessible to a detachable processor, and an interconnect between at least one telephony device and a telephone line, said event buffering system comprising:

means for monitoring each incoming and outgoing telephony event occurring on said telephone line;

means, responsive to said means for monitoring, for generating a record of each of said incoming and outgoing telephony event occurring on said telephone line;

means for storing in said telephone management device, said record of each of said incoming and outgoing telephony event during a time when said detachable processor is in at least one state selected from a group consisting of: non-operational and communicatively disconnected from said telephone management device; and means for transferring stored ones of said record of each of said incoming and outgoing telephony event, in addition to real time ones of said record of each of said incoming and outgoing telephony event, during a time when said detachable processor is operational and communicatively connected to said telephone management device.

* * * * *